United States Patent
Nelson et al.

(10) Patent No.: US 11,127,171 B2
(45) Date of Patent: Sep. 21, 2021

(54) DIFFERENTIATING IN-CANVAS MARKUPS OF DOCUMENT-ANCHORED CONTENT

(71) Applicant: Microsoft Technology Licensing, LLC, Redmond, WA (US)

(72) Inventors: Alyssa Nelson, Seattle, WA (US); Michael M. Santos, Seattle, WA (US); Zeguang Wu, Kirkland, WA (US); Yong Zhang, Kirkland, WA (US); Sneha Jayaprakash, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/295,977

(22) Filed: Mar. 7, 2019

(65) Prior Publication Data
US 2020/0286262 A1 Sep. 10, 2020

(51) Int. Cl.
*G06F 17/00* (2019.01)
*G06T 11/00* (2006.01)
*G06F 40/154* (2020.01)
*G06F 3/0484* (2013.01)

(52) U.S. Cl.
CPC ........ *G06T 11/001* (2013.01); *G06F 3/04842* (2013.01); *G06F 40/154* (2020.01); *G06T 2200/24* (2013.01)

(58) Field of Classification Search
None
See application file for complete search history.

(56) References Cited

U.S. PATENT DOCUMENTS

| | | | |
|---|---|---|---|
| 7,246,308 B1 * | 7/2007 | Leblang ............... | G06F 16/954 715/205 |
| 2003/0018668 A1 * | 1/2003 | Britton ............... | G06F 16/9558 715/230 |
| 2003/0043189 A1 * | 3/2003 | Rieffel ............... | G06Q 10/10 715/753 |
| 2006/0053364 A1 | 3/2006 | Hollander et al. | |
| 2008/0046845 A1 * | 2/2008 | Chandra ............. | G06F 40/14 715/856 |
| 2010/0017700 A1 * | 1/2010 | Odean ............... | G06F 40/169 715/230 |

(Continued)

OTHER PUBLICATIONS

"International Search Report and Written Opinion Issued in PCT Application No. PCT/US20/019560", dated Aug. 3, 2020, 17 Pages.

*Primary Examiner* — Mustafa A Amin
(74) *Attorney, Agent, or Firm* — Michael Best & Friedrich LLP (57) ABSTRACT

A system for selectively rendering highlights in a working document. The system includes a user interface, a memory for storing executable program code, and one or more electronic processors. The electronic processors are functionally coupled to the memory and the user interface. The electronic processors are configured to receive a first highlight operation at a highlight manager associated with a first highlight via the user interface. The electronic processors are further configured to transmit the received first highlight operation to a highlight actor, update a document object model associated with the working document based on the received first highlight operation, and render the first highlight on the working document using a first color based on the received first highlight operation.

19 Claims, 5 Drawing Sheets

(56) References Cited

U.S. PATENT DOCUMENTS

| | | | | |
|---|---|---|---|---|
| 2010/0278453 | A1* | 11/2010 | King | G06F 40/197 |
| | | | | 382/321 |
| 2013/0031457 | A1* | 1/2013 | Griffiths | G06F 40/169 |
| | | | | 715/231 |
| 2013/0159830 | A1* | 6/2013 | Lee | G06F 40/137 |
| | | | | 715/208 |
| 2013/0159849 | A1* | 6/2013 | Lee | G06F 40/197 |
| | | | | 715/272 |
| 2013/0191720 | A1* | 7/2013 | Simons | G06F 16/9558 |
| | | | | 715/234 |
| 2014/0156266 | A1* | 6/2014 | Tsang | G06F 3/16 |
| | | | | 704/9 |
| 2014/0164352 | A1* | 6/2014 | Denninghoff | H03H 9/25 |
| | | | | 707/711 |
| 2015/0220227 | A1* | 8/2015 | Landau | G06F 3/0483 |
| | | | | 715/201 |

\* cited by examiner

DIFFERENTIATING IN-CANVAS MARKUPS OF DOCUMENT-ANCHORED CONTENT

SUMMARY

Productivity applications, such as word processing applications, spreadsheets, note taking applications, and the like are used by millions of people at home and at work. These applications often include features that allow multiple authors or users to provide comments, edits, highlights, and other changes to a working document, such as a word processing document. Users of Microsoft Word® word processing software, for example, are familiar with the "Track Changes" function which tracks changes to a document as those changes are made by one or more users. Often, multiple changes or markups, and even multiple markups from multiple reviewers, may be present on a working document. These markups may ultimately clutter the document, making it difficult for a user to consume or produce document content. For example, the colors and markings associated with the markups may distract a user from focusing on a single reading or writing task within the document. Further, as more and more collaborative features are integrated into the productivity applications, more and more markup types may be present on the document, including different types of conversations (for example, comments) and other related content, leading to additional user confusion. Thus, a system and method for selectively rendering highlights in a working document within a user interface of a computing device, are described herein.

For example, one embodiment provides a system for selectively rendering highlights in a working document. The system includes a user interface, a memory for storing executable program code, and one or more electronic processors. The electronic processors are functionally coupled to the memory and the user interface. The electronic processors are configured to receive a first highlight operation at a highlight manager associated with a first highlight via the user interface. The electronic processors are further configured to transmit the received first highlight operation to a highlight actor, update a document object model associated with the working document based on the received first highlight operation, and render the first highlight on the working document using a first color based on the received first highlight operation.

A further embodiment provides a method for selectively rendering highlights in a working document within a user interface of a computing device. The method includes receiving, via the computing device, a first highlight operation at a highlight manager associated with a first highlight, and transmitting, via the computing device, the received first highlight operation to a highlight actor. The method also includes updating, via the computing device, a document object model associated with the working document based on the received first highlight operation, and rendering the first highlight on the working document using a first color based on the received first highlight operation.

A further embodiment provides a method for selectively rendering highlights in a working document within a user interface of a computing device. The method includes receiving, via the computing device, a first highlight operation at a highlight manager associated with a first highlight, and transmitting, via the computing device, the received first highlight operation to a highlight actor. The method further includes updating, via the computing device, a document object model associated with the working document based on the received first highlight operation, and rendering the first highlight on the working document using a first color based on the received first highlight operation. The method also includes receiving a second highlight operation while the first highlight operation is active, rendering a second highlight associated with the second highlight operation using a second color, and re-rendering the first highlight using a third color, wherein the first highlight is re-rendered to lessen the intensity of the first highlight.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The ability to digitally mark up working documents can sometimes create an array of different colors and changes within the working documents, which can be confusing to users. The following concepts describe devices, systems, and methods for providing an environment for viewing various markups in a working document that reduces confusion by reducing the amount of markup (for example, temporarily hiding or disabling markups) displayed to a user.

Figure 1:
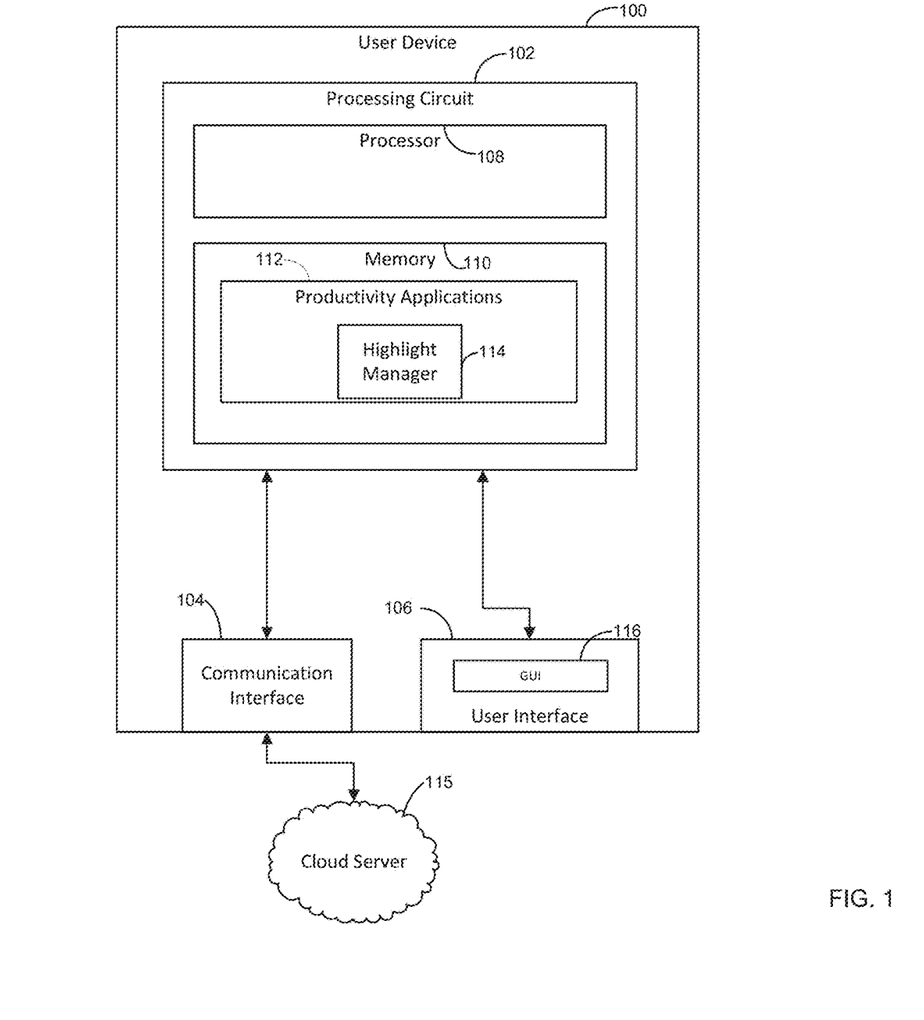
FIG. 1 is a block diagram of a computing device, according to some embodiments.

Turning now to FIG. 1, a block diagram of an example computing device 100 is shown, according to some embodiments. The computing device 100 may be a personal computer, a laptop computer, a tablet computer, a mobile device such as a smartphone, a dedicated purpose computing device, etc. As shown in FIG. 1, the computing device 100 includes a processing circuit 102, a communication interface 104, and a user interface 106. The processing circuit 100 includes an electronic processor 108 and a memory 110. The processing circuit 102 may be communicably connected to one or more of the communication interface 104 and the user interface 106. The electronic processor 108 may be implemented as a programmable microprocessor, an application specific integrated circuit (ASIC), one or more field programmable gate arrays (FPGA), a group of processing components, or with other suitable electronic processing components.

The memory 110 (for example, a non-transitory, computer-readable medium) includes one or more devices (for example, RAM, ROM, Flash memory, hard disk storage, etc.) for storing data and/or computer code for completing or facilitating the various processes, layers, and modules described herein. The memory 110 may include database components, object code components, script components, or other types of code and information for supporting the various activities and information structure described in the present application. According to one example, the memory 110 is communicably connected to the electronic processor 108 via the processing circuit 102 and may include computer code for executing (for example, by the processing circuit 102 and/or the electronic processor 108) one or more processes described herein.

The communication interface 104 is configured to facilitate communication between the computing device 100 and one or more external devices or systems, such as those shown in FIG. 1. The communication interface 104 may be or include wireless communication interfaces (for example, antennas, transmitters, receivers, transceivers, etc.) for conducting data communications between the computing device 100 and one or more external devices, such as a cloud based server 115, or other remote services. In some embodiments, the communication interface 104 utilizes one or more wireless communication protocols, such as cellular (3G, 4G, 5G, LTE, CDMA, etc.), Wi-Fi, Wi-MAX, ZigBee, ZigBee Pro, Bluetooth, Bluetooth Low Energy (BLE), RF, LoRa, LoRaWAN, Near Field Communication (NFC), Z-wave, 6LoWPAN, Thread, WiFi-ah, and/or other wireless communication protocols. The communication interface 104 may additionally be or include wired communication interfaces to facilitate wired communication between the computing device 100 and one or more other devices, such as those described in FIG. 1. The wired communication interfaces may be or include jacks, wire terminals, ports, etc. for conducting data communications between the user device 102 and one or more external devices. The communication interface 104 may include wired interfaces such as Universal Serial Bus (USB) interfaces, USB-C interfaces, Firewire interfaces, CATS interfaces, universal asynchronous receiver/transmitter (UART) interfaces, serial (RS-232, RS-485), fiber optic interface, etc.

The user interface 106 may allow for a user to provide inputs to the computing device 100. For example, the user interface 106 may include a keyboard, a mouse, a trackpad, a touchscreen (for example, resistive, capacitive, inductive, etc.), or other known input mechanism. The user interface 106 may further provide a display to allow a user to view various data provided by the computing device 100. The user interface 106 may further be configured to provide a display of a graphical user interface ("GUI"), such as GUI 116, which may be used by a user to provide inputs to the user interface 106, as well as display certain data to the user.

As described above, the memory 110 may be configured to store various processes, layers, and modules, which may be executed by the electronic processor 108 and/or the processing circuit 102. In one embodiment, the memory 110 may store or include one or more productivity applications. Productivity applications may include word processing programs, note applications, spreadsheets, presentation applications, and the like. For example, productivity applications may include one or more applications from the Microsoft Office Suite, such as Microsoft Word®, Microsoft Excel®, Microsoft PowerPoint®, and Microsoft OneNote®. However, the concepts contained herein are not limited to the above productivity applications, and may be used on any productivity applications that allow for multiple users to provide comments, edits, etc. The productivity applications 112 may allow a user to generate types of working documents (for example, spreadsheets, word processing documents, presentations, notes, etc.). Further, the productivity applications 112 may allow for one or more other user to access and provide markups to a document. Markups, such as comments, edits, and highlights will be described in more detail below. In one embodiments, the productivity applications 112 store generated working documents on the cloud server 115. However, in other examples, the productivity applications 112 may further store the generated working documents on the memory 110.

The memory 110 may further include a highlight manager 114. In one embodiment, the highlight manager 114 is stored within the productivity applications 112. In other embodiments, the highlight manager 114 may be a separate program capable of communicating with one or more of the productivity applications 112. The highlight manager 114 may be configured to manage markups provided by different users to a generated working document. The highlight manager 114 may, in some embodiments, be stored and/or accessed via the cloud-based server 115. In some embodiments, the highlight manager 114 is in communication with one or more editing tools within the productivity applications 112. The highlight manager 114 may further be configured to generate one or more output files based on the markups made by a user in a specific document. The output files may be connected to a specific documents, such that when a user accesses the specific documents, the markups will be made available. In some examples, the highlight manager 114 generates an extensible markup language (.xml) file, which may be accessed by the productivity applications 112.

Figure 2:
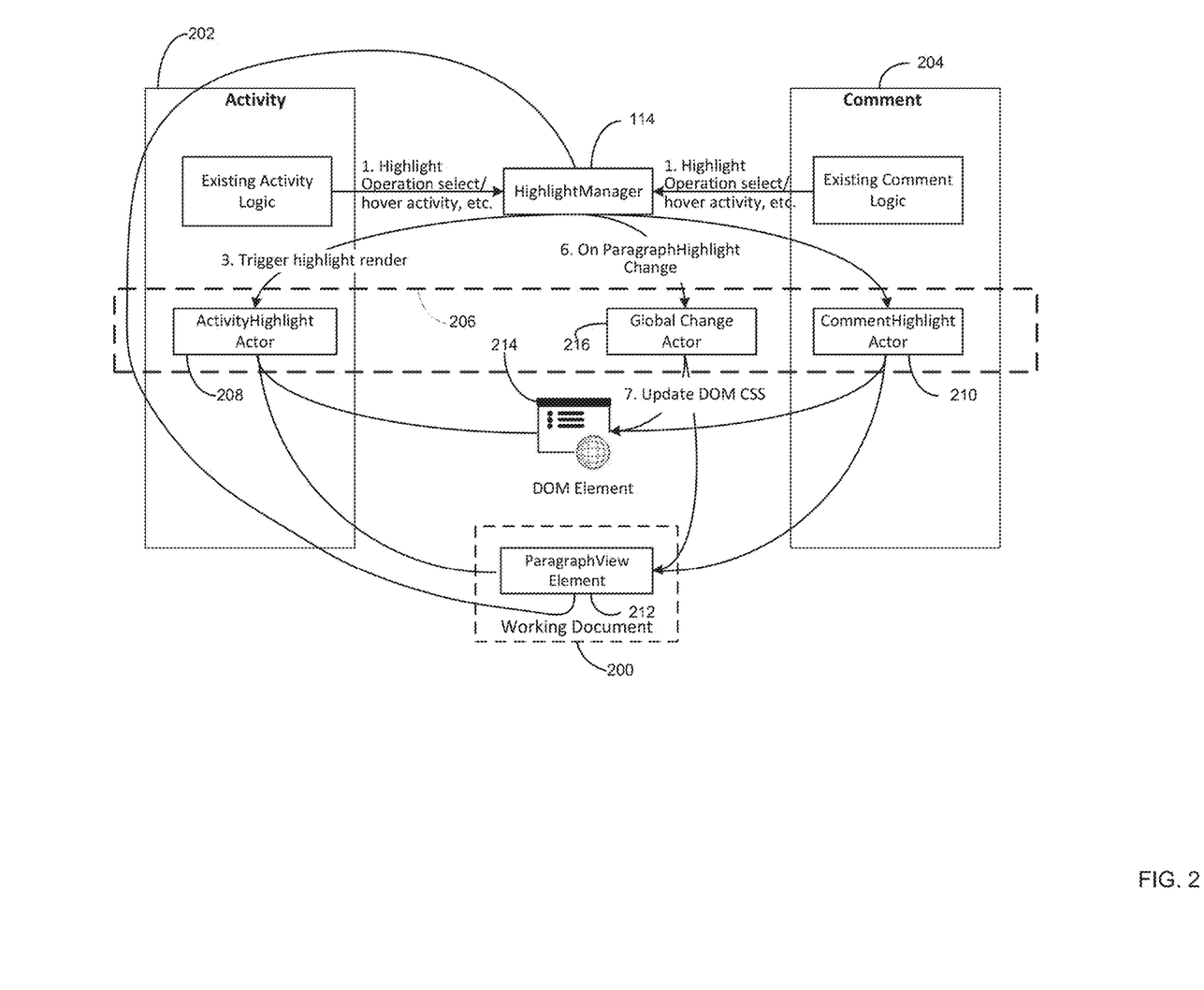
FIG. 2 is a block diagram of a component diagram for processing highlight operations, according to some embodiments.

Turning now to FIG. 2, a component diagram illustrating the interaction between one or more of the above components (for example, the productivity applications and the highlight manager) is shown, according to some embodiments. The component diagram is representative of a possible series of actions or activities taken on a working document, such as those associated by the productivity applications 112, described above. As shown in FIG. 2, two different types of actions may be associated with a given document, such as working document 200. As described above, working document 200 may be a word processing document (for example, .doc, .docx, etc.), a spreadsheet document (for example, .xls, xlsx, etc.), a drawing file (for example, .vsd, .vsdx, etc.), a note documents (for example, .one, etc.), or other document types associated with one or more productivity applications. Two example types of actions include activity actions and comment actions. The activity actions may be executed via an activity application 202 and the comment actions may be executed via a comment application 204. The activity application 202 and the comment application 204 may be integrated within a specific productivity application, such as those described above. In other embodiments, the activity actions 202 and comment actions 204 may be add-in type applications that can be used across various productivity applications.

The activity application 202 may allow for various activity actions to be taken by users within the working document 200. Example activities may include tracked mark-ups within a documents (for example, edits, additions, deletions, etc.), highlights, changes since last save, etc. In one configuration, activities are anchored to a specific location within the document canvas (for example, the white space, or working space within the document). The comment application 204 may allow for a user, or multiple users, to insert comments or notes into a document at various locations. Similar to the activities, comments may be anchored to specific locations within the document canvas as well. In one embodiments, the activities and comments may be indicated on the working document 200 using one or more symbols.

Figure 4A:
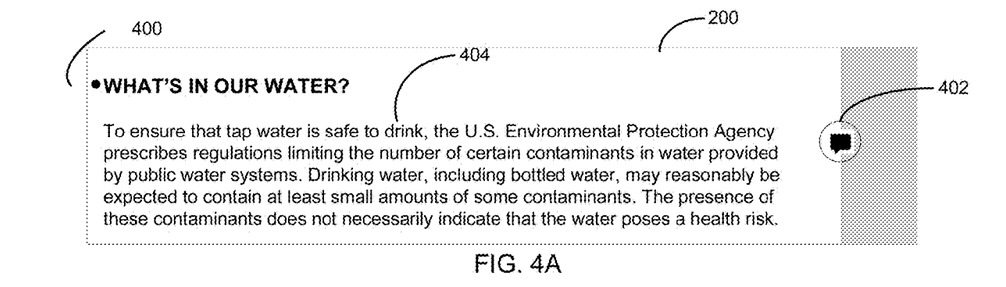
FIGS. 4A-4E are screenshots illustrating various highlight operations, according to some embodiments.

Turning now to FIG. 4A, a portion of an example working document, such as working document 200, is shown. The working document 200 includes an activity symbol 400 and a comment symbol 402. The activity symbol 400 and the comment symbol 402 are highlight access elements which may be used by a user to access a previously made highlight within the working document. The activity symbol 400 and the comment symbol 402 may be anchored on the document canvas 404. The determination of the anchoring position may be determined based on the location within the working document 200 that the activities and/or comments are performed. A user may access the activity symbol 400 and/or the comment symbol 402 to reveal the associated content, as will be described in more detail below. For example, the user may access the activity symbol 400 and/or the comment symbol 402 via a user interface, such as user interface 106. For example, the user may use a mouse or other peripheral device to select the activity symbol 400 and/or the comment symbol 402 within the GUI 116.

Returning now to FIG. 2, it is shown that the highlight manager 114 is in communication with both the activity application 202 and the comment application 204. Generally, the highlight manager 114 is configured to store new comments and activities entered by a user. For purposes of this application, it is understood that the highlight manager 114 monitors, stores, and manages all activities and/or comments, which may collectively be referred to as highlights. The highlight manager 114 is also configured to provide access to, and control the display of, activities and comments within the working document 200.

The highlight manager 114 may receive a highlight access input from a user. In one embodiment, the user may provide the highlight access input via a user interface such as user interface 106 and/or GUI 116. The highlight access input may be intended to access either an activity from the activity application 202 or a comment via the comment application 204. In some embodiments, the highlight access input may be performed by an input device such as a computer mouse, and may be a hover or click operation. For example, the user may hover the cursor over elements within the working document 200, such as the activity symbol 400 and/or the comment symbol 402, described above. The highlight manager 114 then triggers a highlight render function by communicating with a highlight actor 206 within the productivity application. The highlight actor 206 may include multiple sub-actors. For example, the highlight actor 206 may include an activity highlight sub-actor 208 associated with the activity application 202, and a comment highlight sub-actor 210 associated with the comment application 204. Other sub-actors may also be within the highlight actor 206. In one embodiment, the highlight actor 206 and all associated sub-actors are managed by the highlight manager 114. The highlight manager 114 may be configured to iterate all the highlight actors, and control the order in which they operate. This allows the highlight manager 114 to control the interaction between highlight operations performed by the highlight actors 206.

In one example, the highlight actor 206, and the associated sub-actors, are configured to trigger highlights on the working document 200, such as within the paragraph view element 212. In a further example, the highlight actor 206, and the associated sub-actors are also configured to update a document object model (DOM) 214. For example, the highlight actor 206 updates one or more cascading style sheets (CSS) within the DOM 214, based on the highlighting operations received by the highlight manager.

Figure 4B:
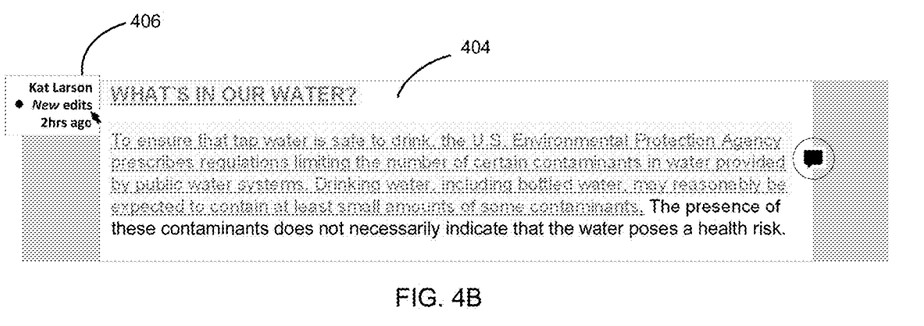

Turning now to FIG. 4B, a hovering operation is performed so that the cursor is positioned over the activity symbol 400, thereby generating a highlight access input. The highlight manager 114 may receive the highlight access input and instruct the appropriate highlight actor to render the highlight associated with the activity symbol 400. As the highlight access input is associated with the activity application 202, the activity highlight actor 208 is instructed by the highlight manager 114 to generate the appropriate highlighting. As shown in FIG. 2, the activity highlight actor 208 updates the DOM element 214 and renders the appropriate highlighting within the working document 200, and paragraph view element 212. The rendering by the activity highlight actor 208 renders highlight element 404 shown in FIG. 4B, as well as an activity data element 406. The activity data element 406 may include data related to the activity data element 404, such as a status (for example, new, previously viewed, etc.), an owner of the highlight, and a time in which the highlight was made. In one embodiment, the highlight manager 114 stores and/or controls the data contained within the highlight data element 406. In one example, the highlight manager 114 directly renders the activity data element 406 onto the working document 200 (and/or within the paragraph view element 212). In other examples, the highlight manager 114 provides the data contained within the activity data element 406 to the highlight actor 206 and/or the appropriate sub-actor, such as the activity highlight actor 208.

Figure 4C:
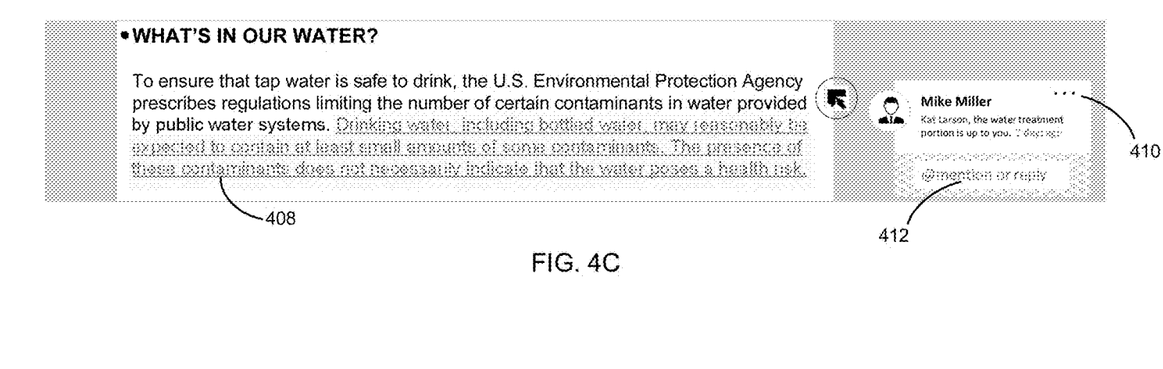

Turning now to FIG. 4C, a separate highlight access input is provided to the highlight manager 114. Specifically, a hover action is performed over the comment symbol 402, thereby generating a highlight access input. The highlight manager 114 receives the highlight access input and instructs the appropriate highlight actor to render the highlight associated with the activity symbol 400. As the highlight access input is associated with the comment application 204, the comment highlight actor 210 is instructed by the highlight manager 114 to generate the appropriate highlighting. The comment highlight actor 210 updates the DOM element 214 and renders the appropriate highlighting within the working document 200, and paragraph view element 212. The rendering by the comment highlight actor 210 renders highlight element 408 shown in FIG. 4C, as well as a comment data element 410. The comment data element 410 may include the substance of the comment related to highlight element 408. The comment data element 410 may include additional data, for example, an owner of the comment, a time in which the comment was made and an input element to add additional comments. In one embodiment, the highlight manager 114 stores and/or controls the data contained within the comment data element 412. In one example, the highlight manager 114 directly renders the comment data element 412 onto the working document 200 (and/or within the paragraph view element 212). In other examples, the highlight manager 114 provides the data contained within the comment data element 412 to the highlight actor 206 and/or the appropriate sub-actor, for example, the comment highlight actor 208.

In some instances, a user performs a "click" action as opposed to a hover action when attempting to access a highlight. For example, the user may "click" the comment signal 402. In some embodiments, the highlight manager 114 performs different actions based on receiving a "click" input versus a "hover" input. The "hover" input may be referred to as a "dynamic" or temporary action, while the "click" input may be referred to as a "static" action. If in the example shown in FIG. 4C, the user had performed a "click" action, the highlight manager 114 renders the highlight element 408 and the comment data element 412 as described above. However, if the user moves the cursor, the comment highlight 408 and the comment data element 410 will continue to be rendered. If the user then initiates an additional highlight operation, such as performing a hover operation over the activity symbol 400 as shown in FIG. 4D, the highlight manager alters how the different highlights are displayed.

Figure 4D:
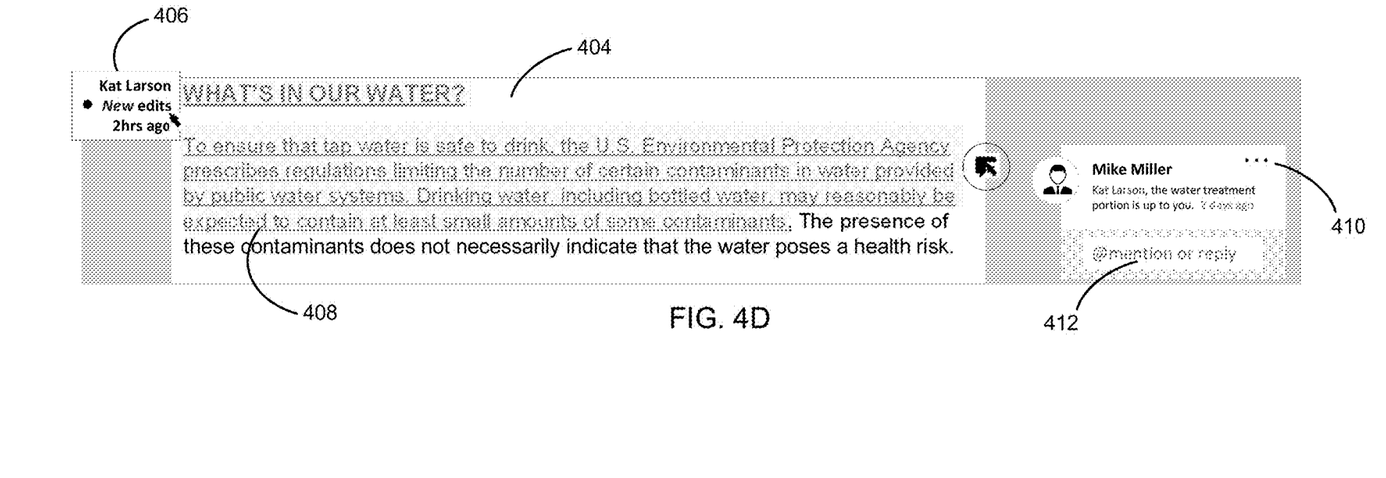

As shown in FIG. 4D, upon the user performing a hover input over the activity symbol 400, the highlight manager 114 renders the associated activity data element 406 and activity highlight 404. Because the user performed a static "click" function on the comment symbol 402, the comment highlight 408 remained highlighted when the user moved the cursor. When the highlight manager 114 renders the associated activity data element 406 and activity highlight 404, the highlight manager 114 "greys out" comment highlight 408. "Greying out" the comment highlight may include changing the color of the highlight to a less intense shade (for example, grey), or otherwise modify the highlight to make it less obvious to a user. By greying out the comment highlight 408, the user's attention is drawn to the activity highlight 404. While not shown in the illustrated figures, a similar operation may occur where the user performs a static "click" action on the activity signal, and subsequently performs a dynamic "hover" or other operation on the comment symbol. In that instance, the highlight manager 114 may render the comment highlight 408 and the comment data element 410, and grey out the activity highlight 404. As used above, the term "grey out" should be interpreted to mean any operation where the highlight is modified to blend into the background of the working document 200 (i.e. become less intense), and is not necessarily color dependent. The above example illustrates that a user may execute a "static" action by "clicking" one of the activity symbols and/or the comment symbols 402, or otherwise performing an action to initiate the "static" action. The user may perform a similar action (for example, clicking the activity symbol 400 and/or comment symbol 402) to instruct the highlight manager 114 to remove the static highlight.

Figure 4E:
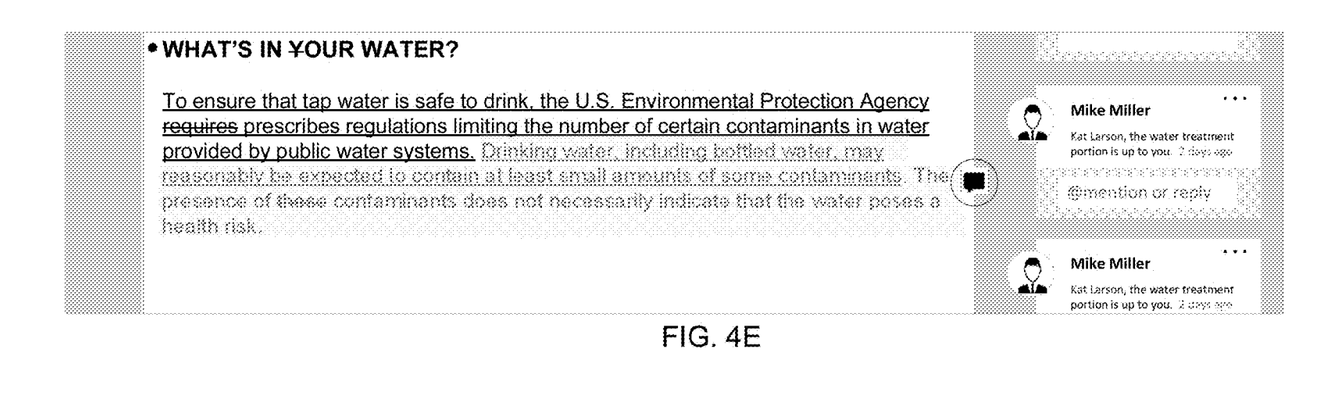

Turning to FIG. 4E, the highlight actor 206 may further include a global highlight sub-actor 216. The global highlight sub-actor 216 may be configured to allow for global (for example, over the entire working document 200) changes to be made. For example, a global highlight may allow the activity highlights 404 and/or comment highlights 408 to also show previously made changes (for example, tracked changes). An example can be seen in FIG. 4E, which shows a portion of a document where the tracked changes are globally shown. In this example, the user selects to have the tracked changes shown in the highlights, which is reflected in the text shown in FIG. 4E. These changes are maintained, even when the user activates other highlighted portions, such as by selecting the comment symbol 402 shown in FIG. 4E. The highlight manager 114 renders the tracked changes in the working document 200, and also renders the comment highlights 408 upon the user selecting the comment symbol. Similar to above, the activity highlight 404 may be rendered upon the user selecting the activity symbol 400, regardless of the global change condition. A user may initiate global changes using editing or other tools within the productivity applications 112. These global changes may allow for a user to globally render different highlights, such as tracked changes, comments, etc. without the user having to perform a static or dynamic operation to a specific highlight, as described above.

Figure 3:
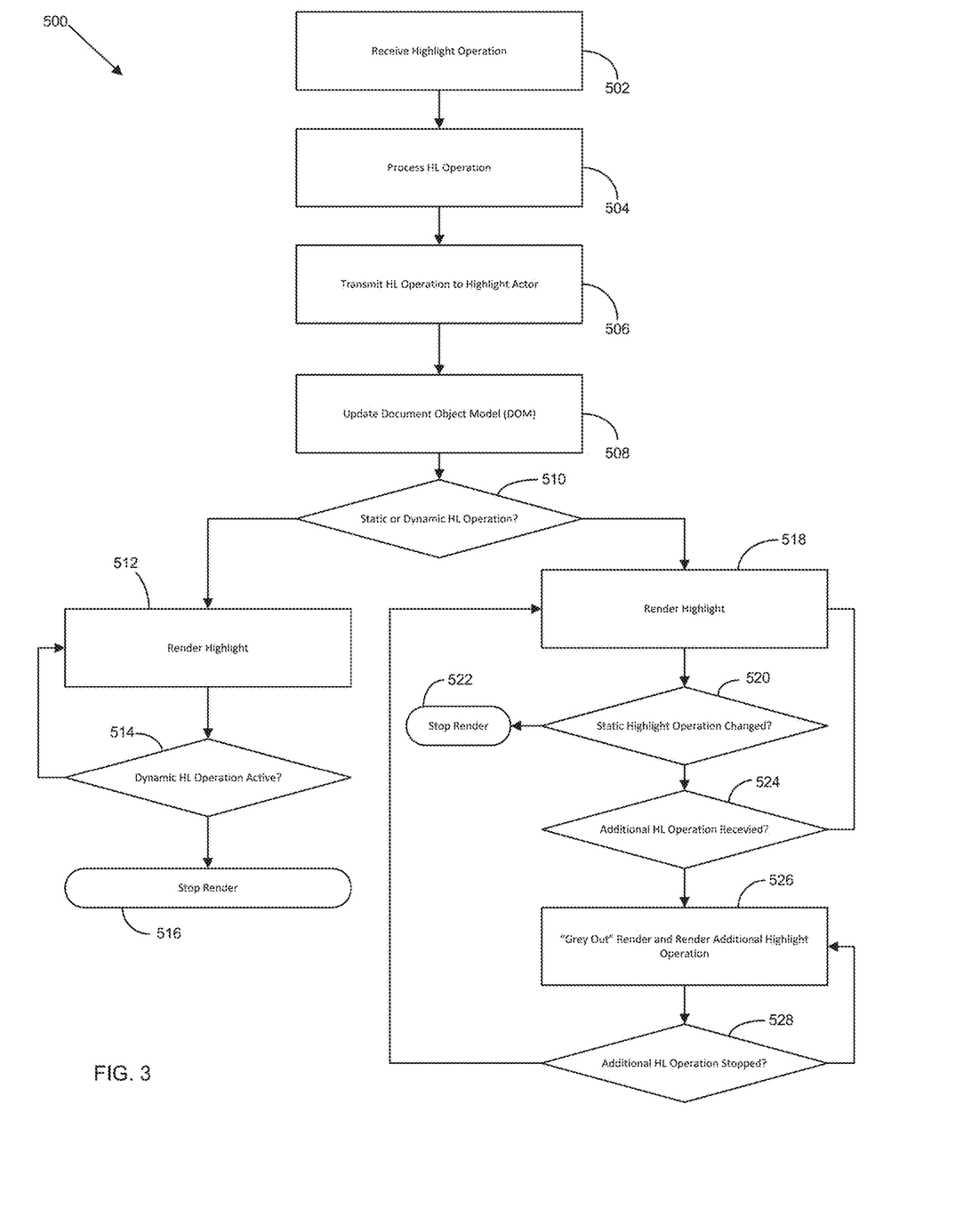
FIG. 3 is a process diagram illustrating a process for executing highlight operations, according to some embodiments.

Turning now to FIG. 3, a process diagram illustrating an example process 500 for selectively rendering highlights in a working document is shown. The process 500 described below may be executed using the systems and devices described above, as well as by other applicable systems and devices. At process block 502, a highlight operation is received by a highlight manager, for example, the highlight manager 114 described above. The highlight operation may be a user selection of one or more "highlights" on a working document. As described above, highlights may include edits, comments, notes, highlights, etc., that were previously made within the working document. The received highlight operation may be a user selection of one or more highlight inputs in the working document, such as the activity symbol 400, the comment symbol 402, and/or via global highlighting, described above.

Upon receiving the highlight operation, the highlight manager processes the highlight operation at process block 504, and transmits the highlight operation to a highlight actor, such as highlight actor 206, at process block 506. In some embodiments, the highlight manager directs the highlight operation to one or more sub-actors, such as activity highlight sub-actor 208, comment highlight sub-actor 210, and/or global highlight actor 216, described above. The highlight manager directs the highlight to the appropriate sub-actors based on the processing of the highlight operation at process block 504. In some embodiments, the highlight manager determines if the highlight operation is static or dynamic. However, in other examples, the highlight actor may determine if the highlight operation is static.

If the highlight operation is determined to be dynamic at process block 510, the process moves to process block 512 where the highlight is rendered. In some embodiments, the highlight manager renders the highlight. However, in other examples, the highlight actor or sub-actors may render the highlight. At process block 514, it is determined whether the dynamic highlight operation is active. In some embodiments, the highlight manager determines if the dynamic highlight operation is active. However, in other examples, the highlight actor or sub-actors may determine if the highlight operation is active. If the dynamic highlight operation is determined to still be active, the highlight remains rendered at process block 512. If the dynamic operation is determined to be no longer be active, the rendering is stopped at process block 516.

Returning now to process block 510, if the highlight operation is determined to be static at process block 510, the highlight is rendered at process block 518. In some embodiments, the highlight manager renders the highlight. However, in other examples, the highlight actor or sub-actors renders the highlight. At process block 520, it is determined whether the static highlight operation has changed. In some embodiments, the highlight manager determines if the static highlight operation has changed. However, in other examples, the highlight actor or sub-actors determines if the static highlight operation has changed. If it is determined that the static highlight operation has changed, the rendering is stopped at process block 522. If it is determined that the static highlight operation has not changed, it is then determined if an additional highlight operation has been received by the highlight manager at process block 526. If an additional highlight operation has not been received, the highlight continues to be rendered at process block 518.

If an additional highlight operation is determined to be received at process block 524, a "grey out" operation is performed on the rendered highlight. As described above, the "grey out" operation alters the highlight, such as by changing the highlight color to a color and intensity that make it blend into the background of the document and/or become less noticeable to the user. At the same time, the received additional highlight operation is rendered, such as by the process 500 described herein. At process block 528, it is determined whether the additional highlight operation is still active. In some embodiments, the highlight manager determines if the additional highlight operation is still active. However, in other examples, the highlight actor or sub-actors may determine if the additional highlight operation is still active. If the additional highlight operation is determined to still be active, the process returns to process block 526. If the additional highlight operation is determined to no longer be active, the process 500 returns to process block 518, where the originally received static highlight operation is rendered.

At process block 508, a document object model, such as document object model 214 is updated by the appropriate highlight actor or sub-actor. Once the document object model is updated, it is determined whether the highlight operation was a static or dynamic highlight operation at process block 510. As described above, a static highlight operation is one where the user wished the highlight to remain after they have moved a cursor or other input device. In contrast, a dynamic highlight operation may be the result of a "hover" action by the user, where the highlight operation is only active while the user has the cursor, or other input device, over an active part of the highlight, such as the activity symbol 400 and/or the comment symbol 402.

The functional block diagrams, operational scenarios and sequences, and flow diagrams provided in the figures are representative of exemplary systems, environments, and methodologies for performing novel aspects of the disclosure. While, for purposes simplicity of explanation, methods included herein may be in the form of a functional diagram, operational scenario or sequence, or flow diagram and may be described as a series of acts, it is to be understood and appreciated that the methods are not limited by the order of acts, as some acts may, in accordance therewith, occur in a different order or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above.

The invention claimed is:

1. A method for selectively rendering highlights in a working document within a user interface of a computing device, the method comprising:
    receiving, via the user interface of the computing device, a first highlight operation at a highlight manager associated with a first highlight, wherein the first highlight operation is a static highlight operation;
    transmitting, via the computing device, the received first highlight operation to a highlight actor;
    updating, via the computing device, a document object model associated with the working document based on the received first highlight operation; and
    rendering the first highlight on the working document using a first color based on the received first highlight operation;
    receiving, via the user interface of the computing device, a second highlight operation while the first highlight operation is active, wherein the second highlight operation is a dynamic highlight operation;
    rendering a second highlight associated with the second highlight operation using a second color; and
    re-rendering the first highlight in response to receiving the second highlight operation, wherein the first highlight is re-rendered to lessen an intensity of the first highlight.

2. The method of claim 1, wherein the first highlight operation is based on a user selecting a highlight access element.

3. The method of claim 2, wherein the highlight access element is associated with a previously performed highlight within the working document.

4. The method of claim 1, wherein a highlight comprises one or more of a comment, an edit, and a highlighted text portion.

5. The method of claim 1, further comprising:
    determining that the first highlight operation is no longer active; and
    stopping the rendering of the first highlight on the working document based on determining that the first highlight operation is no longer active.

6. The method of claim 1, further comprising:
    determining that the second highlight operation is no longer active; and
    rendering the first highlight in the first color based upon the second highlight operation no longer being active.

7. The method of claim 1, wherein the working document is selected from a list consisting of a word processing document, a spreadsheet document, a drawing document, and a note taking document.

8. A method for selectively rendering highlights in a working document within a user interface of a computing device, the method comprising:
    receiving, via the user interface of the computing device, a first highlight operation at a highlight manager associated with a first highlight, wherein the first highlight operation is a static highlight operation;
    transmitting, via the computing device, the received first highlight operation to a highlight actor;
    updating, via the computing device, a document object model associated with the working document based on the received first highlight operation;
    rendering the first highlight on the working document using a first color based on the received first highlight operation;
    receiving, via the user interface of the computing device, a second highlight operation while the first highlight operation is active, wherein the second highlight operation is a dynamic highlight operation;
    rendering a second highlight associated with the second highlight operation using a second color; and
    re-rendering the first highlight using a third color in response to receiving the second highlight operation, wherein the first highlight is re-rendered to lessen an intensity of the first highlight.

9. The method of claim 8, further comprising:
    determining that the second highlight operation is no longer active; and
    rendering the first highlight in the first color based upon the second highlight operation no longer being active.

10. The method of claim 8, wherein the first highlight operation and the second highlight operation are based on a user selecting a first highlight access element associated with the first highlight operation and a second highlight access element associated with the second highlight operation.

11. A system for selectively rendering highlights in a working document, the system comprising:
- a user interface;
- a memory for storing executable program code; and
- one or more electronic processors, functionally coupled to the memory and the user interface, the one or more electronic processors configured to:
  - receive a first highlight operation via the user interface at a highlight manager associated with a first highlight via the user interface, wherein the first highlight operation is a static highlight operation;
  - transmit the received first highlight operation to a highlight actor;
  - update a document object model associated with the working document based on the received first highlight operation;
  - render the first highlight on the working document using a first color based on the received first highlight operation;
  - receive a second highlight operation via the user interface while the first highlight operation is active via the user interface, wherein the second highlight operation is a dynamic highlight operation;
  - render a second highlight associated with the second highlight operation; and
  - re-render the first highlight in response to receiving the second highlight operation, wherein the first highlight is re-rendered to lessen an intensity of the first highlight.

12. The system of claim 11, wherein the first highlight operation is based on a user selecting a highlight access element via the user interface.

13. The system of claim 12, wherein the highlight access element is associated with a previously performed highlight within the working document.

14. The system of claim 12, wherein the user selects the highlight access element by placing a cursor over the highlight access element within the working document.

15. The system of claim 11, wherein a highlight comprises one or more of a comment, an edit, and a highlighted text portion.

16. The system of claim 11, wherein the electronic processors are further configured to:
- determine that the first highlight operation is no longer active; and
- stop the rendering of the first highlight on the working document based on determining that the first highlight operation is no longer active.

17. The system of claim 11, wherein the electronic processors are further configured to:
- determine that the second highlight operation is no longer active; and
- re-render the first highlight in the first color based upon the second highlight operation no longer being active.

18. The system of claim 11, wherein the working document is selected from a list consisting of a word processing document, a spreadsheet document, a drawing document, and a note taking document.

19. The system of claim 11, wherein the dynamic highlight operation is a hover operation performed by a user via the user interface.

* * * * *